United States Patent [19]

Kempter et al.

[11] 4,376,849
[45] Mar. 15, 1983

[54] POLYADDUCT/POLYCONDENSATE CONTAINING BASIC NITROGEN GROUPS, ITS PREPARATION AND ITS USE

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[21] Appl. No.: 281,891

[22] Filed: Jul. 9, 1981

[30] Foreign Application Priority Data

Jul. 16, 1980 [DE] Fed. Rep. of Germany ....... 3026823

[51] Int. Cl.³ .................... C08G 8/30; C08L 63/00; C08L 63/10
[52] U.S. Cl. .............. 525/490; 204/181 C; 525/495; 525/502; 528/163
[58] Field of Search ............. 528/159; 525/495, 502, 525/490; 204/181 C

[56] References Cited

U.S. PATENT DOCUMENTS

| | | | |
|---|---|---|---|
| 2,290,675 | 7/1942 | D'Alelio | 528/159 X |
| 3,321,664 | 5/1967 | Phillips et al. | 315/111.61 |
| 3,365,471 | 1/1968 | Becke et al. | 528/250 |
| 3,391,097 | 7/1968 | Williamson | 528/365 |
| 3,450,711 | 6/1969 | Megna et al. | 528/96 |
| 3,503,979 | 3/1970 | Habermeier et al. | 523/445 |
| 3,839,447 | 10/1974 | Swiger et al. | 528/176 |
| 3,844,916 | 10/1974 | Gaske | 204/159.16 |
| 3,888,828 | 6/1975 | Grossmann et al. | 528/159 X |
| 3,994,989 | 11/1976 | Kempter et al. | 204/181 |
| 4,036,795 | 7/1977 | Tominaga | 204/181 |
| 4,039,414 | 8/1977 | McGinniss | 204/181 R |
| 4,147,676 | 4/1979 | Pampouchidis | 204/181 C |
| 4,198,331 | 4/1980 | Buchwalter et al. | 204/181 C X |
| 4,210,506 | 7/1980 | Hoppe et al. | 204/181 C |
| 4,248,753 | 2/1981 | Buchwalter | 204/181 C X |
| 4,256,560 | 3/1981 | Buchwalter et al. | 204/181 C |
| 4,265,793 | 5/1981 | Omika et al. | 204/181 C X |
| 4,336,347 | 6/1982 | Sagoh et al. | 528/159 X |

FOREIGN PATENT DOCUMENTS

| | | |
|---|---|---|
| 2944082 | 5/1980 | Fed. Rep. of Germany . |
| 1172916 | 12/1969 | United Kingdom . |
| 1456486 | 11/1976 | United Kingdom . |
| 2028829 | 3/1980 | United Kingdom . |
| 2028830 | 3/1980 | United Kingdom . |
| 1563917 | 4/1980 | United Kingdom . |
| 1591321 | 6/1981 | United Kingdom . |

OTHER PUBLICATIONS

Organikum, (VEB Deutscher Verlag der Wissenschaften, 1967), pp. 492-494.

*Primary Examiner*—Howard E. Schain
*Attorney, Agent, or Firm*—Keil & Witherspoon

[57] ABSTRACT

A polyadduct/polycondensate which is water-dilutable when protonated with an acid, and which contains basic nitrogen groups, the groups being of the general formula (I)

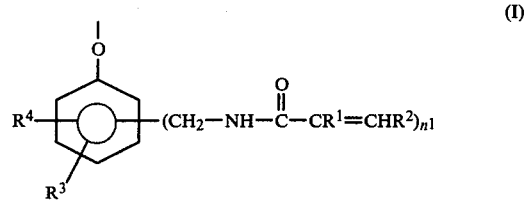

and/or of the general formula (II)

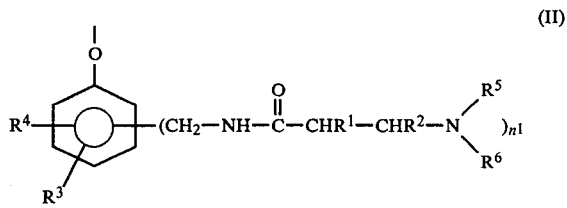

as well as of the formula (III)

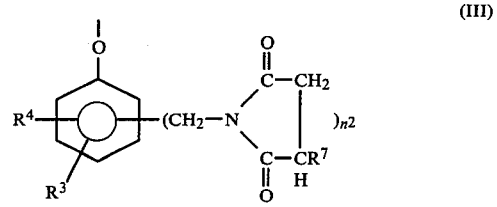

where $R^1$ and $R^2$ are hydrogen or methyl, $R^3$ and $R^4$ are hydrogen, alkyl or a radical bonded to a phenol or phenolether, $R^5$ and $R^6$ are alkyl, hydroxyalkyl or alkoxyalkyl or are linked to one another to form a 5-membered or 6-membered ring, $R^7$ is a polydienyl radical, $n^1=$ from 0.5 to 3 and $n^2=$ from 0.05 to 1.0, and its method of preparation.

The polyadduct/polycondensate can be used, for example, as a surface-coating binder for the cathodic electrocoating of metal articles.

15 Claims, No Drawings

POLYADDUCT/POLYCONDENSATE CONTAINING BASIC NITROGEN GROUPS, ITS PREPARATION AND ITS USE

The present invention relates to polyadducts/polycondensates which are water-dilutable when protonated with an acid, and contain basic nitrogen groups, a process for their preparation, and their use for the cathodic electrocoating of metallic articles.

It is known that synthetic resins which in addition to basic groups contain $\alpha,\beta$-unsaturated carboxylic acid ester groups, for example the resins described in German Laid-Open Application DOS No. 2,429,527, can be crosslinked by polymerization of the double bonds. It has been proposed to use such products inter alia in German Laid-Open Application DOS No. 2,749,776 as cathodic electrocoating binders.

The adduct formation of amines with $\alpha,\beta$-unsaturated carbonyl compounds is described in, for example, Organikum, page 492 (VEB Deutscher Verlag der Wissenschaften 1967).

According to German Laid-Open Application DOS No. 2,346,424, such a reaction is utilized to prepare UV-hardening coating agents.

German Laid-Open Application DOS No. 2,753,861 employs the same reaction for the preparation of cathodic electrocoating binders. According to U.S. Pat. No. 4,039,414, cationic UV-hardening binders are obtained by trans-etherifying methylmethylolacrylamide with an epoxy resin derivative. In order to give the binder cationic character, it is possible to carry out a Michael addition reaction of amines with, for example, polyacrylates which contain double bonds, or to incorporate basic nitrogen via an epoxide/amine reaction.

German Laid-Open Application DOS No. 2,934,467 describes products which contain $\alpha,\beta$-unsaturated amide groups and are suitable for electrocoating, the amide group being bound to the polymer molecule via methylolether bridges. The basic nitrogen groups are introduced via a Michael addition reaction of volatile amines (dimethylamines). An important aspect is that the amines leave the film during baking, and the publication states that in general an oxidative hardening is not possible in the case of (basic) amine-containing resins.

It is an object of the present invention to provide a method of incorporating copolymerizable double bonds into binder systems containing $\alpha,\beta$-unsaturated amidomethylphenyl groups, such as are described, for example, in German Patent Application No. P 29 42 488.2, and to overcome the difficulties of oxidative crosslinking, mentioned in German Laid-Open Application DOS No. 2,934,467. It is a further object that in addition to providing the possibility of copolymerization of the polydiene component in the molecule through the grouping $-CH_2-NH-CO-CR^1=CR^2$, where $R^1$ and $R^2$ are hydrogen or methyl, a degree of inner plasticization of the coatings produced with the binder systems should be achieved.

It is a further object to achieve better compatibility with subsequently admixed polydienes and/or non-basic polydiene derivatives.

It is a further object of the present invention to provide a process for the preparation of cathodic electrocoating binders, which gives better results than the conventional processes in respect of emission of cleavage products on baking, for example emission of amines and/or of $\alpha,\beta$-unsaturated compounds containing acrylic double bonds.

We have found that these objects are achieved, surprisingly, by the incorporation of succinimides carrying polydienyl radicals in the $\alpha$-position.

The present invention relates to polyadducts/polycondensates which are water-dilutable when protonated with an acid and which contain basic nitrogen groups, the groups being of the general formula (I)

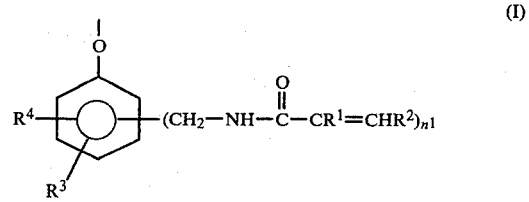

and/or of the general formula (II)

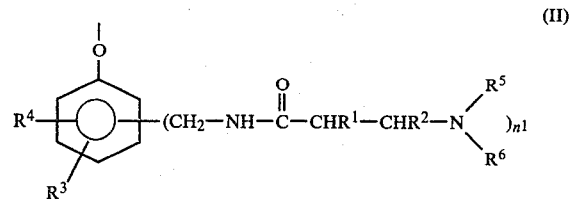

and which additionally contain groups of the formula (III)

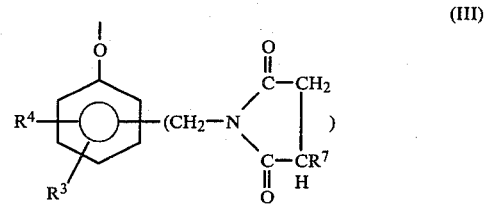

in which formulae $R^1$ and $R^2$ are identical or different and each is hydrogen or methyl, $R^3$ and $R^4$ are identical or different and each is hydrogen, alkyl of 1 to 13 carbon atoms or a methylene, isopropylidene, $-O-$,

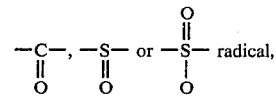

bonded to a phenol or a phenol-ether, $R^5$ and $R^6$ are identical or different and each is alkyl of 1 to 10 carbon atoms or hydroxyalkyl or alkoxyalkyl of 2 to 10 carbon atoms, or $R^5$ and $R^6$ are linked to form a 5-membered or 6-membered ring, $R^7$ is a polydienyl radical, $n^1$ is from 0.5 to 3 and $n^2$ is from 0.05 to 1.0.

The present invention further relates to a process for the preparation of the above polyadducts/polycondensates wherein (A) a mixture of amido- and imido-methylphenols which has been obtained by reacting (a1) mononuclear or polynuclear monophenols and/or polyphenols with (a2) amides of $\alpha,\beta$-olefinically unsaturated carboxylic acids of 3 or 4 carbon atoms, (a3) succinimides which carry a polydienyl radical in the $\alpha$-position and (a4)

formaldehyde or a formaldehyde donor, in the presence of (a₅) an acidic catalyst, with or without (a₆) a secondary amine having undergone adduct formation with some or all of the olefinic double bonds, is reacted with (B) one or more epoxide compounds, with the proviso that from 30 to 80 percent by weight of the mixture of amido- and imido-methylphenol (A) are reacted with from 20 to 70 percent by weight of epoxide compound (B), and that the reaction products thus obtained contain from 0.02 to 10 milliequivalents of basic nitrogen per gram of solids.

Accordingly, a polycondensation first takes place, followed by a polyaddition.

The invention further relates to the use of the novel polyadducts/polycondensates for the cathodic electrocoating of metallic articles.

Component (A) of the novel polyadducts/polycondensates can be obtained by the Tcherniac-Einhorn reaction, by carrying out an acid-catalyzed reaction of N-methylolacrylamide or N-methylolmethacrylamide and succinimide-N-methylol compounds, carrying polydienyl radicals in the α-position, with mononuclear and/or polynuclear phenols.

If desired it is possible thereafter to remove part or all of the α,β-unsaturated double bonds of the groups of the general formula (I) by means of secondary amines, employing a Michael reaction, after which the novel binder is produced by a further reaction, with component (B).

Particularly advantageous embodiments of the product according to the invention are obtained if, in the preparation of component (A), from 0.5 to 70 percent by weight of succinimides, carrying polydienyl radicals in the α-position, are employed as component (a₃). It is also very advantageous if up to 25 percent by weight, preferably from 0.5 to 15 percent by weight, of a polydiene, or of a non-basic polydiene derivative, are admixed to the product according to the invention.

The following details may be noted regarding the components from which the novel polyadducts/polycondensates are synthesized.

(A) The phenols (A) containing amido- and imidomethyl groups can be prepared from (a₁) mononuclear or polynuclear monophenols and/or polyphenols, (a₂) amides of α,β-unsaturated carboxylic acids of 3 or 4 carbon atoms, (a₃) succinimides carrying polydienyl radicals in the α-position and (a₄) formaldehyde or a formaldehyde donor in the presence of (a₅) an acidic catalyst, with or without adduct formation with (a₆) a secondary amine.

(a₁) Suitable mononuclear or polynuclear monophenols and/or polyphenols are phenol and its monoalkyl and dialkyl derivatives, alkyl being of 1 to 15 carbon atoms, for example o- and p-cresol, p-t-butylphenol or naphthols, eg. α- and β-naphthol, as well as ®Cardanol, which is stated to consist essentially of 3-(pentadeca-8,11-dienyl)-phenol, as well as phenols of the general formula

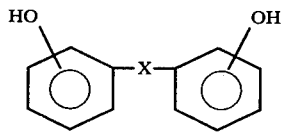

where the hydroxyl groups are in the ortho- or para-position to X, and X is a straight-chain divalent aliphatic radical of 1 to 3 carbon atoms or is $SO_2$, SO, S, CO or O.

Low molecular weight reaction products of phenols with formaldehyde, ie. novolacs, can also be employed as component (a₁), as can at least a proportion of the phenols, containing ether groups, mentioned in German Laid-Open Application DOS No. 2,419,179.

(a₂) Suitable amides of α,β-unsaturated carboxylic acids of 3 to 4 carbon atoms are acrylamide, methacrylamide and crotonamide.

(a₃) Suitable succinimides carrying polydienyl radicals in the α-position are the reaction products containing from 1 to 4 (preferably from 1 to 3) imide groups per molecule, obtained by reacting polydienes with maleic anhydride and then converting the primary product to the imide with ammonia or an ammonia donor.

Suitable polydienes for use in the preparation of component (a₃) are polymers of butadiene, isoprene, chloroprene, penta-1,3-diene, cyclopentadiene and piperylene, particularly preferred polydienes being, however, polymers of butadiene having a mean molecular weight of from 200 to 6,000, preferably from 500 to 3,000, and copolymers of butadiene with, for example, styrene, the products having the conventional fine structure in respect of the character of the double bonds (vinyl-1,2 and cis- and trans-1,4, as well as a proportion of cyclic groups). Suitable polydienes of this type in general have iodine numbers of from 100 to 500, preferably from 200 to 480.

The reaction of the polydienes with maleic anhydride is advantageously carried out by conventional methods, employing the usual amounts of maleic anhydride (in general from 5 to 25%, preferably from 10 to 20%), in accordance with the mean molecular weight of the polydiene. Similar remarks apply to the subsequent conversion of the adduct to the imide by means of ammonia or an ammonia donor, for example urea (cf. German Laid-Open Application DOS No. 2,728,470), ammonium carbonate and the like.

(a₄) Suitable components (a₄) are formaldehyde and formaldehyde donors, such as paraformaldehyde.

(a₅) The reaction of the component (a₁) with (a₂), (a₃) and (a₄) is advantageously carried out in the presence of an acidic catalyst. Imido- and amido-methylation of the aromatic nucleus of the phenol takes place, with elimination of $H_2O$. Such reactions are referred to as Tcherniac-Einhorn reactions. The reaction of 2,2-bis-p-hydroxyphenol-propane with N-methylolacrylamide in glacial acetic acid, using HCl as the catalyst, is described in U.S. Pat. No. 3,839,447.

Other suitable catalysts are p-toluenesulfonic acid, hydrofluoric acid, boron trifluoride diethyletherate and sulfuric acid.

Suitable catalysts for the purposes of the present invention have proved to be sulfonic acids, for example p-toluenesulfonic acid, but especially boron trifluoride diethyl-etherate.

It is of course within the scope of the process of preparation according to the invention to prepare the amide

$HO-CH_2-NH-CO-CR^1=CHR^2$ and imide HO—CH$_2$—N 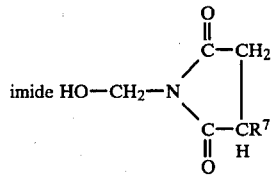

in situ, in the presence of component (a$_1$). For example, the phenol (a$_1$), acrylamide (a$_2$), polybutadiene/maleimide adduct (a$_3$) and paraformaldehyde (a$_4$), in toluene, can be converted to component (A) according to the invention by means of boron trifluoride diethyletherate (a$_5$); this embodiment is particularly preferred.

Component (A) can be prepared within a relatively wide temperature range, namely 30°–150° C., preferably 50°–120° C., advantageously in the presence of a solvent, such as toluene, xylene, isobutanol, ethylglycol, ethylhexanol and the like, and advantageously in the presence of an inhibitor which prevents the formation of free radicals.

The products according to the invention are also obtained if, in place of the above N-methylolamides and N-methylolimides, the corresponding alkyl ethers, for example the methylol butyl ether, are employed.

The ratio of the components (a$_1$), (a$_2$), (a$_3$) and (a$_4$) can be from 1:0.3:0.05:0.35 to 1:4:0.6:6.5, the range 1:0.5:0.05:0.55 to 1:2.0:0.4:0.35 being particularly preferred.

(a$_6$) Suitable components (a$_6$) are secondary amines of the general formula

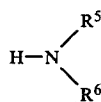

where R$^5$ and R$^6$ are identical or different and each is alkyl of 1 to 10, preferably of 4 to 9, carbon atoms, hydroxyalkyl of 2 to 10 carbon atoms or alkoxyalkyl of 2 to 10 carbon atoms, or R$^5$ and R$^6$ are joined to form a 5-membered or 6-membered ring.

Preferred secondary amines are those which because of their boiling point are only able to leave the film to a slight extent, if at all, even if they should be chemically eliminated during the baking process.

Particularly preferred amines are those having one secondary and one tertiary amino group, for example products chosen from the category of the piperazines, such as N-hydroxyethylpiperazine, or, from the class of the N,N,N'-trimethylalkylenediamines. Their advantage is not only that they have a low volatility but that two amino groups are incorporated per reaction step and that, for example compared with diethanolamine, which also has a low volatility, the N atoms incorporated are substantially more basic and thus the pH of the baths is higher and the catalytic effect on the reaction of component (A) with component (B) is better, or the reaction temperature can be reduced, or the reaction is more specific in respect to the phenolic groups reacting with the epoxide groups.

(B) Suitable epoxide compounds (b) are, in particular, polyepoxide compounds. All conventional epoxy resins can be employed, for example the diglycidyl ethers of bisphenol A, which can be prepared, for example, from bisphenol A and epichlorohydrin in the presence of alkali. The polyglycidyl ethers, of molecular weight 180–2,500, of polyhydric alcohols, for example of pentaerythritol, glycerol, trimethylolpropane, ethylene glycol, diethylene glycol, polyoxyethylene glycols and polyoxypropylene glycols of molecular weight 200–2,000, and other polyhydric, preferably dihydric, trihydric or tetrahydric, alcohols, can also be used.

Other suitable polyepoxide compounds are nitrogen-containing diepoxides as described in U.S. Pat. No. 3,365,471, epoxy resins obtained from 1,1-methylene-bis-(5-substituted hydantoin) as described in U.S. Pat. No. 3,391,097, diepoxides of bis-imides as described in U.S. Pat. No. 3,450,711, epoxidized aminomethyl-diphenyl oxides as described in U.S. Pat. No. 3,321,664, heterocyclic N,N'-diglycidyl compounds as described in U.S. Pat. No. 3,503,979, aminoepoxyphosphates as described in British Pat. No. 1,172,916 and polyepoxides containing blocked isocyanate groups, as described, for example, in British Pat. No. 1,563,917. Glycidyl compounds rich in epoxide groups and having a high epoxide value can also be employed as a mixture with a less than equivalent amount of polyphenols (such as bisphenol-A). The reaction, which takes place in parallel with the reaction of components (A) and (B), is equivalent to using an epoxy resin having a low epoxide value or higher molecular weight. Other suitable materials are 1,3,5-triglycidyl isocyanurates and further epoxide-containing materials well known in the art, for example dicyclopentadiene dioxide, limonene dioxide, epoxidized butadiene oils and glycidyl ethers of phenol ®Cardanol adducts. A proportion of monoepoxide compounds can also be present if this should be desirable, for example in order to adjust the molecular weight of the binder. Glycidyl esters of long-chain carboxylic acids, for example ®Cardura E (from Shell) or glycidyl ethers of long-chain alcohols can also be used, if the binder is to be plasticized, giving more resilient coatings.

It is also possible additionally to use epoxide compounds which are obtained from polyepoxide compounds by reaction with a less than equivalent amount of primary and/or secondary amines or amine salts.

The reaction of the amine with the polyepoxide compound can, if the latter compound is liquid at the reaction temperature, be carried out in the absence of a solvent. It is however also possible to use solvents, for example hydrocarbons, such as benzene or toluene, alcohols, such as isopropanol or isobutanol, ether-alcohols, such as ethylene glycol monoethyl ether, or ketones, ethers, esters and the like. The amines can also be employed in the form of their salts with carbonic acid, or carbon dioxide can be passed through the vessel during the reaction. By these means undesired side-reactions, such as the ortho-condensation of the polyepoxide compounds, can under certain circumstances be suppressed.

Primary or secondary amines which can be used for this purpose are, for example, those of the general formula H$_2$N—R$^5$ or

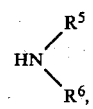

where R$^5$ and R$^6$ are identical or different alkyl of 1 to 10 carbon atoms or hydroxyalkyl or alkoxyalkyl of 2 to 10 carbon atoms or together form a 5-membered or 6-membered ring. Examples of primary or secondary amines which can be employed are monoalkylamines and dialkylamines, eg. methylamine, ethylamine, propylamine, isopropylamine, butylamine, isobutylamine, n-butylamine, dimethylamine, diethylamine, dipropylamine, dibutylamine, pyrrolidine, piperidine, morpholine and the like. The amines can also carry additional functional groups, such as hydroxyl groups and can be, for example, alkanolamines of 2 to 4 carbon atoms, eg. ethanolamine, propanolamine, 3-aminopropanol, diethanolamine, diisopropanolamine and the like.

Amines with more than one basic nitrogen can also be employed, for example 3-dimethylaminopropylamine, 3-diethylaminopropylamine, piperazine, N-methylpiperazine and the like. In general, low molecular weight amines are used, but amines of higher molecular weight can also be employed, especially if the plasticizing action of these amines is desired. A mixture of low molecular weight and high molecular weight amines can also be employed.

If tertiary amine salts are reacted with polyepoxides, binders containing quaternary ammonium groups result.

If salts of tertiary amines are to be employed, they are, in particular, those of amines of the general formula

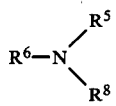

where $R^5$ and $R^6$ have the above meanings and $R^8$ is methyl, ie. amines which contain at least one methyl group. Examples include trimethylamine, dimethylethylamine, dimethylethanolamine, methyldiethanolamine and dimethyldecylamine. Such amines can be employed as salts of carbonic acid or of a carboxylic acid, such as acetic acid, lactic acid, formic acid and the like.

If adduct formation of secondary amines with the $\alpha,\beta$-olefinically unsaturated acid amide group, along the lines of a Micheal addition reaction, is to be avoided, it is advantageous first to carry out the reaction of the epoxide compound with the amine and then to react the residual epoxide groups with the phenol containing $\alpha,\beta$-olefinically unsaturated amidomethyl groups. Both reactions can be carried out at room temperature or temperatures, namely from 30° to 150° C., preferably from 60° to 90° C.

The reaction of the $\alpha,\beta$-olefinically unsaturated double bonds with amines is an optional measure and is only essential if no basic groups whatsoever are to be introduced via component (B).

In that case, all the $\alpha,\beta$-olefinically unsaturated double bonds (ie. acrylic double bonds) can be converted by means of a Michael reaction with secondary amines, with the proviso that the products obtained from (A) and (B) contain from 0.02 to 10, preferably from 0.3 to 5.0, milliequivalents of cationic groups per gram of solid resin. If the products according to the invention are to be employed for cathodic electrocoating in the automotive industry, the range of from 0.3 to 2.0 milliequivalents of cationic groups is particularly preferred.

The amounts of amine introduced in one way or another must at least suffice to ensure that the finished binder is water-dispersible after partial or complete neutralization with an acid.

In general, the amounts of polyepoxide compounds (B) are advantageously chosen to be such that the epoxide groups suffice to build up the desired molecular weight of the binder through reaction with the phenolic OH groups of the monophenols and/or polyphenols carrying unsaturated amidomethyl or imidomethyl groups. The molecular weight of the polyadducts/polycondensates according to the invention is in general from about 500 to 10,000, preferably 1,000 to 5,000. It is not always necessary to react all phenolic OH groups with the epoxide groups; conversely, it is not necessary to react all epoxide groups either.

Preferably, however, the novel polyadducts/polycondensates are free from epoxide groups.

Another possible way of carrying out the process of preparation according to the invention is to add secondary amine and epoxide compound simultaneously to the monophenols and/or polyphenols employed in the preparation of component (A), which carry groups of the formula I. In that case, a rapid and exothermic reaction occurs, in which the amines undergo adduct formation at the unsaturated groups of component (A), whilst the subsequent reaction of the phenolic OH groups with the epoxide groups takes place much more slowly. In this simultaneous addition method, adduct formation of amine with epoxide groups can also occur to a certain degree.

Where monophenols are employed, it is of course necessary to ensure—if only from the point of view of the formation and emission of cleavage products during hardening—that substantially all the phenolic OH groups are reacted with epoxide groups. According to the invention, an excess of 5-50% of epoxide equivalents is employed in order to compensate for the loss of epoxide groups during the reaction of component (A) with component (B).

The reaction of component (A) with component (B) is carried out at from 50° to 120° C., preferably from 70° to 90° C. Advantageously, the same temperature range is also chosen for the Michael reaction.

The polyadducts/polycondensates according to the invention can be diluted with the conventional surface-coating solvents, such as alcohols of 3 to 16 carbon atoms, eg. isopropanol, n- or iso-butanol or decanol, alkyl-aromatics, for example toluene and xylene, and cycloaliphatics, as well as with (oligomeric) glycols and glycol-ethers or other water-dilutable organic solvents, and are applied, with or without admixture of pigments, fillers and conventional surface-coating auxiliaries, to the substrate which is to be coated, for example wood, metal, glass or ceramics, by conventional surface-coating methods, such as spraying, dipping or flooding; the coating is then dried and hardened at above 150° C. The coatings thus obtained are distinguished by, for example, great hardness and resistance to solvents.

The products according to the invention can also advantageously be hardened by irradiation with infrared or ultraviolet or with electron beams, the product being used, where appropriate, with reactive diluents, such as monoacrylates and diacrylates, and with the conventional ultraviolet initiators advantageously employed in ultraviolet hardening, for example benzoin ethers or benzil ketals.

Preferably, however, the novel polyadducts/polycondensates, where appropriate in combination with up to 25% by weight of other binders, for example the polybutadiene oils referred to earlier, are employed protonated with acids, for example phosphoric acid and its derivatives or, preferably, water-soluble carboxylic acids, eg. acetic acid, formic acid or lactic acid. The protonated surface-coating binder is water-dilutable and can be applied using the conventional coating methods mentioned above, again giving coatings having very valuable properties.

The preferred use of the novel protonated polyadducts/polycondensates is as surface-coating binders for the cathodic electrocoating of electrically conductive substrates, for example metal articles, sheets and the like made of brass, copper or aluminum, metallized plastics or materials coated with conductive carbon, as well as iron and steel, which may or may not be chemically pretreated, for example phosphatized.

The aqueous solutions or dispersions of the novel products, which are at least partially in the form of a salt of a water-soluble carboxylic acid, can also contain auxiliaries which can be cataphoretically electrodeposited as a mixture with the novel products, examples of such auxiliaries being pigments, eg. carbon black, talc, titanium dioxide, kaolin, basic lead chromate, iron oxide pigments and the like, soluble dyes, solvents, flow improvers, stabilizers, anti-foams and other additives, and hardening catalysts, especially the manganese naphthenates and octoates and cobalt naphthenates or octoates which accelerate autoxidative hardening, as well as metal salts of the prior art, as mentioned, for example, in German Laid-Open Applications DOS No. 2,541,234 and DOS No. 2,457,437.

For cathodic electrocoating, the solids content of the electrocoating bath is in general brought to 5-30 percent by weight by dilution with demineralized water. The deposition is in general carried out at from 15° to 40° C. for a period of from 1 to 2 minutes at a bath pH of from 4.0 to 8.5, preferably from 5.5 to 7.5, and at a deposition potential of from 50 to 500 volts. After the film deposited on the electrically conductive article has been rinsed, it is hardened for from 10 to 30 minutes at about 140° C.–200° C., preferably for about 20 minutes at from 150° C. to 180° C.

The Examples which follow illustrate the invention without implying a limitation thereof. In the Examples, parts and percentages are by weight.

EXAMPLE 1

Preparation of a Succinimide Carrying Polydienyl Radicals in the α-Position 1,700 parts of a polybutadiene oil having a molecular weight of about 900, and containing 40-50% of 1,2-vinyl groups, 30-35% of trans-1,4 groups and 25-30% of cis-1,4 groups (for example Lithene PL ® from Metallgesellschaft AG), 300 parts of maleic anhydride, 20 parts of methyl isobutyl ketone and 2 parts of phosphorous acid are reacted for 4 hours at 190° C. under a stream of nitrogen. 83.2 parts of urea are then added in the course of about 40 minutes, at 160° C. The mixture is then stirred for 3 hours at 190° C., with elimination of water. Thereafter, the product is diluted to a solids content of 80% (calculated) with 455 parts of toluene. The actual solids content is 79.7%; the imide content is 2.0%, based on solid resin.

EXAMPLE 2

Preparation of a Succinimide Carrying Polydienyl Radicals in the α-Position 2,000 parts of a polybutadiene oil having a molecular weight of about 900 and containing 40-50% of 1,2-vinyl groups, 10-20% of trans-1,4 groups, 5-10% of cis-1,4 groups and 30-40% of alicyclic structures (for example ®Lithene AL from Metallgesellschaft AG), 353 parts of maleic anhydride, 24 parts of methyl isobutyl ketone and 2.4 parts of phosphorous acid are reacted for 4 hours at 190° C. under a stream of nitrogen. 100 parts of xylene are then added at 160° C., and 121.4 parts of urea are introduced slowly. The mixture is then stirred for 3 hours at 190° C., with elimination of water. Thereafter, the product is diluted to a solids content of 80% (calculated) with 520 parts of toluene. The actual solids content is 80.1%; the imide content is 1.9%, based on solid resin.

EXAMPLE 3

Preparation of an Epoxide/Amine Adduct 160.4 parts of a glycidyl ether obtained from pentaerythritol and epichlorohydrin and having an epoxide value of 0.623, 126.6 parts of isopropanol and 14.1 parts of fully demineralized water are heated to 60° C., the mixture being flushed with $CO_2$ throughout the reaction.

34.7 parts of diethanolamine are added dropwise in the course of 30 minutes, at 60° C. The mixture is stirred for a further 15 minutes at this temperature, after which 998 parts of a diglycidyl ether obtained from bisphenol A and epichlorohydrin, and having an epoxide value of 0.5, are added. The mixture is then again heated to 60° C. and 228.8 parts of diethanolamine are added dropwise in the course of 30-40 minutes at 60° C. Thereafter the reaction is continued for a further 2 hours at 60° C.

EXAMPLE 4

1,228.5 parts of a diglycidyl ether obtained from bisphenol A and epichlorohydrin and having an epoxide value of 0.2, 125.6 parts of isopropanol and 14.1 parts of fully demineralized water are heated to 60° C., the mixture being flushed with $CO_2$ throughout the reaction. 184 parts of diethanolamine are added dropwise in the course of 30-40 minutes at 60° C. Thereafter the reaction is allowed to continue for 2 hours at 60° C.

EXAMPLE 5

210 parts of the polybutadiene-maleimide prepared as described in Example 1, 56.6 parts of bisphenol A, 40.5 parts of paraformaldehyde, 90 parts of acrylamide, 64.5 parts of phenol, 0.2 part of hydroquinone monomethyl ether, 0.5 part of phenothiazine and 32.9 parts of toluene are heated at 100° C. until a solution is formed, and the latter is then stirred for a further 30 minutes at 100° C., and is cooled to 50° C. At 50° C., 1.5 parts of boron trifluoride diethyl-etherate are added, and the mixture is reacted at the same temperature for 1 hour, after which a further 1.5 parts of boron trifluoride diethyl-etherate are added. After being stirred for a further hour at 50° C., the mixture is heated to 60° C., stirred at this temperature for 2 hours and then diluted with 70.8 parts of isobutanol to a theoretical solids content of 70%. The water is then removed at an external temperature of 140° C., the internal temperature being kept below 115° C.; the time required is about 1.5 hours. 600 parts of the product from Example 3, 103 parts of isopropanol and 103 parts of ethylglycol are then added. The batch is allowed to react at 90° C. for about 8 hours, or until a 70% strength sample has reached a viscosity of 2,400 mPa.s (measured by means of the ICI plate-and-cone viscometer). 9 parts of acetic acid and 100 parts of fully demineralized water are then added. The solids content of the product obtained is 66%.

EXAMPLE 6

208.9 parts of the polybutadiene-maleimide prepared in Example 2, 90 parts of acrylamide, 85 parts of phenol, 53.4 parts of paraformaldehyde, 0.2 part of hydroquinone monomethyl ether, 0.5 part of phenothiazine and 25.2 parts of toluene are heated at about 105° C. until a solution is obtained, which is then stirred for a further 30 minutes at 105° C. and cooled to 50° C. At 50° C., 1.5 parts of boron trifluoride diethyl-etherate are added and after the mixture has reacted for 1 hour at 50° C., a further 1.5 parts of boron trifluoride diethyletherate are added. The mixture is again stirred for 1 hour at 50° C. and is then diluted with 70.9 parts of toluene to a theroetical solids content of 70%. The water is then removed at an external temperature of 150° C., the time required being about 1.5 hours. 30 parts of hydroxyethylpiperazine are then added at 70° C. After this mixture has been stirred for one hour at 70° C., 93.3 parts of isopropanol, 93.3 parts of ethylglycol, 31.9 parts of bisphenol A, 65 parts of an epoxy resin based on bisphenol A and having an epoxide value of 0.2 (for example Epoxy 1/33 from Chemapol (Czechoslovakia)) and 506.7 parts of an epoxide/amine adduct prepared according to Example 4 are added.

The batch is allowed to react at 90° C. until a 70% strength sample has reached a viscosity of 2,400 mPa.s at 75° C. (measured by means of the ICI plate-and-cone viscometer), this being the case after about 2 hours. The reaction is then stopped by adding 9 parts of acetic acid and 100 parts of fully demineralized water. The solids content is 66.3%.

EXAMPLE 7

Component (A) is prepared as described in Example 6 and is then treated further with 5 parts of hydroxyethylpiperazine.

Thereafter, 100 parts of ethylglycol, 100 parts of isopropanol and 618.0 parts of an epoxide/amine adduct prepared according to Example 3 (by successively using 120.3 parts of a glycidyl ether obtained from pentaerythritol and epichlorohydrin and having an epoxide value of 0.623; 190 parts of isopropanol and 21.2 parts of H$_2$O; 26 parts of diethanolamine; 1,497 parts of a glycidyl ether obtained from bisphenol A and epichlorohydrin and having an epoxide value of 0.5; and a further 343.2 parts of diethanolamine) are added.

The batch is allowed to react at 90° C. until a 70% strength sample has reached a viscosity of 2,400 mPa.s at 75° C. (measured by means of the ICI plate-and-cone viscometer), this being the case after about 5 hours.

The reaction is then stopped by adding 9 parts of acetic acid and 100 parts of fully demineralized water. The solids content is 68%.

EXAMPLE 8

Electrocoating

To prepare a 10% strength coating bath, 100 parts of the solid resin from Example 5 are protonated with 1.8% of acetic acid and diluted to 1,000 parts with fully demineralized water.

500 ppm (based on bath volume) of lead are then added as an aqueous lead acetate solution. The coating bath is stirred for 24 hours at 25° C.; it has a pH of 6.2 and a conductivity of $1.35 \times 10^{-3}$ S.cm$^{-1}$. After this 24 hours' stirring, 5 parts of isodecanol are added.

On phosphatized steel sheets, deposition for 2 minutes at 140 V and 25° C., and hardening for 20 minutes at 180° C., gives a 15 μm thick coating. On steel sheets which have not been pretreated, deposition for 2 minutes at 50 V and 25° C. and hardening for 20 minutes at 180° C. gives a 15 μm thick coating which in both cases resistant to bending and to impact.

The DIN 50,021 corrosion test, carried out for 10 days, gives a penetration of 0.5–1.8 mm on iron-phosphatized steel sheets which have been rinsed with water and dried in air (for example Bonder ® 1040 WL), and a penetration of 0.5–2.2 mm on zinc-phosphatized steel sheets which have been rinsed with water and dried in air (for example Bonder ® 127 WL), the distance being measured from the cut in each case. Steel sheets which have not been pretreated showed a penetration of 1–5 mm, measured from the cut, after 10 days.

EXAMPLE 9

To prepare a 10% strength coating bath, 92 parts of the solid resin from Example 5, 8 parts of Polyöl Hüls 130 and 4 parts of Alfol 1214/4 from Condea Chemie (a C$_{12-14}$ alcohol mixture) are thoroughly mixed, protonated with 1.9% (based on solid resin) of acetic acid and diluted to 1,000 parts with fully demineralized water. 500 ppm (based on bath volume) of lead are then added as an aqueous lead acetate solution. The coating bath is stirred for 24 hours at 25° C.; it has a pH of 6.1 and a conductivity of $1.3 \times 10^{-3}$ S.cm$^{-1}$. After this stirring, 7 parts of isodecanol are added.

On phosphatized steel sheets, deposition for 2 minutes at 90–120 V and 25° C., and hardening for 20 minutes at 180° C., gives a 15 μm thick coating. On bright steel sheets, deposition for 2 minutes at 50 V and 25° C., and hardening for 20 minutes at 180° C., gives a 15 μm thick coating which is resistant to bending and impact. The DIN 50,021 corrosion test, carried out for 10 days, gives a penetration of 0.6–2.2 mm, measured from the cut, on iron-phosphatized steel sheets which have been rinsed with water and dried in air (for example Bonder 1041 WL). Steel sheets which have not been pretreated show a penetration of 1–3.3 mm (measured from the cut) after 10 days.

EXAMPLE 10

To prepare a 10% strength coating bath, 100 parts of the solid resin from Example 6 are protonated with 2.5% of acetic acid and diluted to 1,000 parts with fully demineralized water. 500 ppm (based on bath volume) of lead are then added as an aqueous lead acetate solution. The coating bath is stirred for 24 hours at 25° C.; it has a pH of 5.6 and a conductivity of $1.08 \times 10^{-3}$ S.cm$^{-1}$. After this stirring, 10 parts of isodecanol are added. On phosphatized steel sheets, deposition for 2 minutes at 140 volt at 25° C., and hardening for 20 minutes at 180° C., gives a 15 μm thick coating. On bright steel sheets, deposition for 2 minutes at 80 volt and 25° C., and hardening for 20 minutes at 180° C., gives a 16 μm thick coating.

The DIN 50,021 corrosion test, carried out for 10 days, gives a penetration of 0.2–1.3 mm on iron-phosphatized steel sheets which have been rinsed with water (for example Bonder 1041 W), and a penetration of 0.3–0.9 mm on zinc-phosphatized steel sheets which have been air-dried (for example Bonder 127 L), the distance being measured from the cut in each case. Steel sheet which have not been pretreated show a penetration of 0.6-3.1 mm, measured from the cut, after 10 days.

EXAMPLE 11

To prepare a 10% strength coating bath, 261 parts of the binder from Example 7, 26 parts of a polybutadiene oil of molecular weight about 1,800, as referred to in Example 2 (for example Lithene AH from Metallgesellschaft AG), 22 parts of Alfol 1214/4 (from CondeaChemie) and 1.0 part of manganese naphthenate (for example Soligen ®-Mangan from Hoechst AG, containing 6% of Mn) are mixed, protonated with 4.7 parts of 99% strength acetic acid and diluted to 2,000 parts with fully demineralized water.

500 ppm (based on bath volume) of lead, as an aqueous lead acetate solution, and 10 parts of butyldiglycol, are then added. The coating bath is stirred for 48 hours at 30° C. It has a pH of 5.8 and a conductivity of $1.6 \times 10^{-3}$ S.cm$^{-1}$.

On phosphatized steel sheets, deposition for 2 minutes at 120-130 V and 30° C., and hardening for 20 minutes at 180° C., gives a 16 μm thick coating. On non-pretreated steel sheets deposition for 2 minutes at 80 V and 30° C., and hardening for 20 minutes at 180° C. gives 16 μm thick coatings which in both cases are smooth, resistant to impact and bending, and show no change after 100 double rubs (cf. German Laid-Open Application DOS No. 2,934,467) with an acetone-soaked cottonwool pad.

To test the aging of the bath, the latter is stirred for a further 30 days at 30° C. The condition and data of the bath, the deposition data and the appearance of the films are virtually unchanged.

The DIN 50,021 corrosion test, carried out for 10 days, gives a penetration of 0.5-1.2 mm on iron-phosphatized steel sheets which have been rinsed with water and dried in air (for example Bonder 1041 WL), and a penetration of 1.5-1.2 mm on zinc-phosphatized steel sheets which have been rinsed with water and dried in air (for example Bonder 127 WL), the distance being measured from the cut in each case. Steel sheets which have not been pretreated show a penetration of 0.3-2.5 mm, measured from the cut, after 10 days.

We claim:

1. A polyadduct/polycondensate which is water-dilutable when protonated with an acid, which polyadduct/polycondensate is suitable for the cathodic electrocoating of metallic articles and which contains basic nitrogen groups, the groups being of the formula (I)

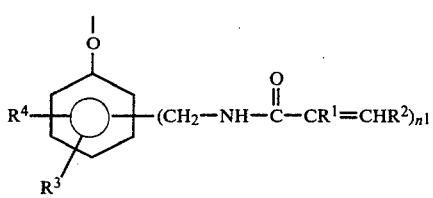

and/or of the formula (II)

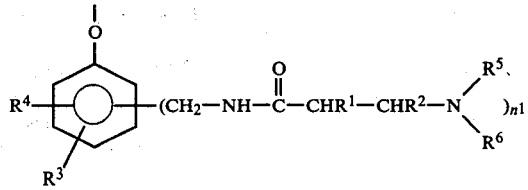

and which additionally contains groups of the formula (III)

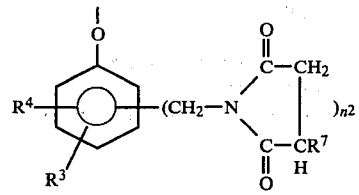

in which formulae $R^1$ and $R^2$ are identical or different and each is hydrogen or methyl, $R^3$ and $R^4$ are identical or different and each is hydrogen, alkyl of 1 to 13 carbon atoms or a methylene, isopropylidene, —O—,

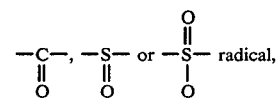

bonded to a phenol or a phenol-ether, $R^5$ and $R^6$ are identical or different and each is alkyl of 1 to 10 carbon atoms or hydroxyalkyl or alkoxyalkyl of 2 to 10 carbon atoms, or $R^5$ and $R^6$ are links to form a 5-membered or 6-membered ring, $R^7$ is a polydienyl radical, $n^1$ is from 0.5 to 3 and $n^2$ is from 0.05 to 1.0.

2. A polyadduct/polycondensate as claimed in claim 1, to which up to 25% by weight, based on solid resin, of a polydiene has been added.

3. A process for the preparation of the polyadducts/polycondensates as claimed in claim 1, wherein (A) a mixture of amido- and imido-methylphenols which has been obtained by reacting (a$_1$) mononuclear or polynuclear monophenols or polyphenols with (a$_2$) amides of α,β-olefinically unsaturated carboxylic acids of 3 or 4 carbon atoms, (a$_3$) succinimides which carry a polydienyl radical in the α-position and (a$_4$) formaldehyde or a formaldehyde donor, in the presence of (a$_5$) an acidic catalyst, with or without (a$_6$) a secondary amine having undergone adduct formation with some or all of the olefinic double bonds, is reacted with (B) one or more epoxide compounds, with the proviso that from 30 to 80 percent by weight of the mixture of amido- and imido-methylphenol (A) are reacted with from 20 to 70 percent by weight of epoxide compound (B), and that the reaction products thus obtained contain from 0.02 to 10 milliequivalents of basic nitrogen per gram of solids.

4. A process as claimed in claim 3, wherein component (B) is an epoxide compound which has been obtained by partial reaction of a polyepoxide with a primary or secondary amine or with a mixture of primary and secondary amines.

5. A process as claimed in claim 3, wherein acrylamide is used as component ($a_2$).

6. A process as claimed in claim 4, wherein acrylamide is used as component ($a_2$).

7. A process as claimed in claim 3, wherein component ($a_3$) is a reaction product of a polydiene, having a mean molecular weight of from 200 to 6,000, with maleic anhydride, which product has been converted to the imide by reaction with ammonia or with an ammonia donor.

8. A process as claimed in claim 4, wherein component ($a_3$) is a reaction product of a polydiene, having a mean molecular weight of from 200 to 6,000, with maleic anhydride, which product has been converted to the imide by reaction with ammonia or with an ammonia donor.

9. A process as claimed in claim 5, wherein component ($a_3$) is a reaction product of a polydiene, having a mean molecular weight of from 200 to 6,000, with maleic anhydride, which product has been converted to the imide by reaction with ammonia or with an ammonia donor.

10. A process as claimed in claim 3, wherein N-hydroxyethylpiperazine is used as component ($a_5$).

11. A process as claimed in claim 4, wherein N-hydroxyethylpiperazine is used as component ($a_5$).

12. A process as claimed in claim 5, wherein N-hydroxethylpiperazine is used as component ($a_5$).

13. A process as claimed in claim 6, wherein N-hydroxyethylpiperazine is used as component ($a_5$).

14. A process as claimed in claim 7, wherein N-hydroxyethylpiperazine is used as component ($a_5$).

15. A process for the cathodic electrocoating of metallic articles, wherein the binder used is the polyadduct/polycondensate, which is water-dilutable due to protonation with acid, and which contains basic nitrogen groups, as claimed in claim 1.

* * * * *